March 23, 1948. M. SIMCICH 2,438,302
PERCOLATOR BOWL STRAINER
Filed May 14, 1946
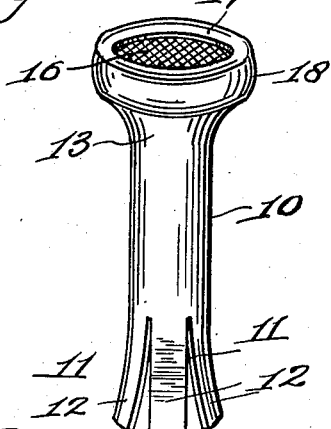
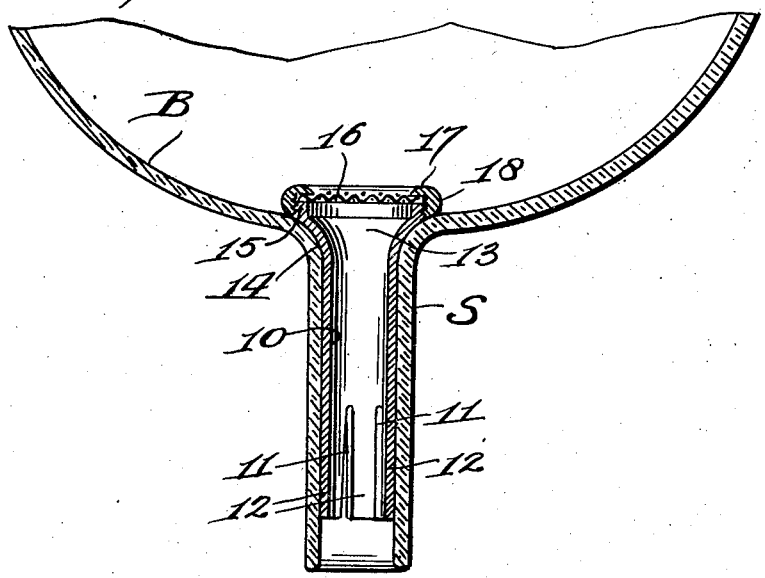
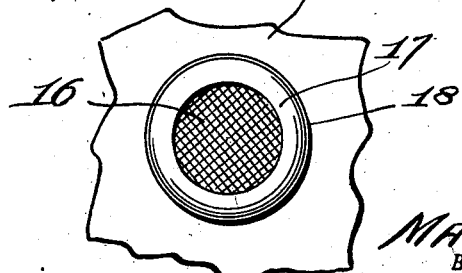
INVENTOR.
MATT SIMCICH.
BY
ATTY.

Patented Mar. 23, 1948

2,438,302

UNITED STATES PATENT OFFICE 2,438,302

PERCOLATOR BOWL STRAINER

Matt Simcich, Los Angeles, Calif.

Application May 14, 1946, Serial No. 669,643

1 Claim. (Cl. 210—162)

My invention relates to a strainer for the bowls of percolators, and has for its principal object, to provide a simple, practical and inexpensive all-metal strainer which may be easily and quickly applied for use in the percolator bowl and its depending spout and which strainer is constructed so that no extra or separate packing element is required between said bowl and strainer.

A further object of my invention is to provide a strainer of the character referred to having integral means, preferably a series of resilient fingers for yieldingly engaging the spout of the percolator, and thus anchoring the strainer in position for use.

A further object of my invention is, to provide a percolator bowl strainer which may be readily taken apart and reassembled, thus facilitating cleansing and maintenance of the strainer in a sanitary condition.

With the foregoing and other objects in view, my invention consists in certain novel features of construction and arrangement of parts which will be hereinafter more fully described and claimed and illustrated in the accompanying drawings, in which:

Fig. 1 is a perspective view of the improved strainer.

Fig. 2 is a vertical section taken through the lower portion of percolator bowl and showing the strainer positioned in said bowl and its spout.

Fig. 3 is a plan view of the strainer positioned in the bowl and spout.

Referring by numerals to the accompanying drawings which illustrate a preferred embodiment of my invention, 10 designates a tube of metal, plastics, or the like, the external diameter of which is slightly less than the internal diameter of the spout S of a conventional percolator bowl B and the lower portion of said tube is slit lengthwise as designated by 11, to provide a plurality of resilient fingers 12 which are gradually spread apart toward their lower ends (see Fig. 1).

The upper end portion 13 of tube 10, flares outwardly so as to fit snugly in the correspondingly flared throat 14 from bowl B into spout S, and the upper end of said portion 13, terminates in a ring 15 having an external thread.

Resting on top of ring 15, is a separately formed, readily removable screen 16, preferably fine mesh wire, and which is retained in position by the inwardly projecting flange 17, on the upper end of a ring 18, same having an internal thread for engaging the thread of said ring 15.

When the strainer is applied to the bowl and its spout, fingers 12 are pressed toward each other, in order to enable the tube 10 to be inserted in the spout and when said tube is in proper position with the flared upper end seated in throat 14, the contracted fingers 12 tending to expand, will exert sufficient pressure against the wall of the spout to firmly retain the tube in operative position.

Screen 16, which permits ready flow of liquid in both directions through tube 10 and spout S, and prevents the passage of coffee grounds downwardly through said tube and spout, may be readily removed and cleansed by unscrewing ring 18 from ring 15, thus enabling the strainer to be maintained in a sanitary condition. Tube 10 and ring 18 may be formed of suitable metal or plastic and if formed of metal, they may be chrome plated, thus enhancing their appearance and rendering them rustproof.

Thus it will be seen that I have provided a strainer for percolator bowls, that is simple and compact in structure, inexpensive of manufacture and very effective in performing the functions for which it is intended.

Minor changes in the size, form and construction of the various parts of my improved strainer, may be made and substituted for those herein shown and described without departing from the spirit of the invention, the scope of which is set forth in the appended claim.

I claim as my invention:

A strainer for percolator bowls having depending tubular stems, comprising a tube of such size and shape as to fit snugly within the depending stem of the bowl, the upper end of said tube being flared so as to fit snugly on the curved shoulder between the bowl and its stem, an externally threaded flange projecting upwardly from the flared upper end of said tube, a screen resting on top of said threaded flange and an internally threaded ring screw seated on said flange and overlying the edge of said screen.

MATT SIMCICH.

REFERENCES CITED

The following references are of record in the file of this patent:

UNITED STATES PATENTS

| Number | Name | Date |
|---|---|---|
| 197,836 | Dodge | Dec. 4, 1877 |
| 1,167,259 | Bleichrode | Jan. 4, 1916 |
| 1,595,516 | Happ | Aug. 10, 1926 |
| 1,788,760 | Applegate | Jan. 13, 1931 |

FOREIGN PATENTS

| Number | Country | Date |
|---|---|---|
| 159,291 | Great Britain | Feb. 21, 1921 |